(12) United States Patent
Salesse-Lavergne et al.

(10) Patent No.: US 10,518,870 B2
(45) Date of Patent: Dec. 31, 2019

(54) ELECTRIC CONTROL MEMBER, A ROTARY WING AIRCRAFT, AND A METHOD

(71) Applicant: AIRBUS HELICOPTERS, Marignane (FR)

(72) Inventors: Marc Salesse-Lavergne, Allauch (FR); Kamel Abdelli, Marseilles (FR); Olivier Sellier, Eguilles (FR); Jean-Romain Bihel, Le Rove (FR)

(73) Assignee: AIRBUS HELICOPTERS, Marignane (FR)

( * ) Notice: Subject to any disclaimer, the term of this patent is extended or adjusted under 35 U.S.C. 154(b) by 234 days.

(21) Appl. No.: 15/727,826

(22) Filed: Oct. 9, 2017

(65) Prior Publication Data
US 2018/0099739 A1  Apr. 12, 2018

(30) Foreign Application Priority Data
Oct. 12, 2016 (FR) ...................................... 16 01481

(51) Int. Cl.
*B64C 13/04* (2006.01)
*B64D 31/04* (2006.01)
(Continued)

(52) U.S. Cl.
CPC .......... *B64C 13/0421* (2018.01); *B64C 11/30* (2013.01); *B64C 13/04* (2013.01); *B64C 13/044* (2018.01); *B64C 13/28* (2013.01); *B64C 13/341* (2018.01); *B64C 13/42* (2013.01); *B64C 13/50* (2013.01); *B64C 13/505* (2018.01);
(Continued)

(58) Field of Classification Search
USPC ............................................................ 701/3
See application file for complete search history.

(56) References Cited

U.S. PATENT DOCUMENTS

| 4,542,679 A * | 9/1985 | Murphy ................. F15B 18/00 91/363 A |
| 2005/0173595 A1 * | 8/2005 | Hoh ....................... B64C 13/04 244/223 |

(Continued)

FOREIGN PATENT DOCUMENTS

| FR | 2984004 A1 | 6/2013 |
| WO | 2015181525 A2 | 12/2015 |

(Continued)

OTHER PUBLICATIONS

French Search Report for French Application No. FR 1601481, Completed by the French Patent Office, dated Jun. 22, 2017, 7 pages.

Primary Examiner — Tyler D Paige
(74) Attorney, Agent, or Firm — Brooks Kushman P.C.

(57) ABSTRACT

An electric control device having manipulation means. The electric control device has a first measurement system and a second measurement system respectively taking a first measurement and a second measurement of the current position of the manipulation means. A processor unit compares the first and second measurements in order to generate a control signal as a function of said current position, said processor unit considering that the manipulation means are in a neutral position when the first and second measurements do not correspond to the same position for the manipulation means.

17 Claims, 4 Drawing Sheets

(51) Int. Cl.
*B64C 13/50* (2006.01)
*B64C 13/28* (2006.01)
*B64C 27/26* (2006.01)
*B64C 27/56* (2006.01)
*B64C 11/30* (2006.01)
*B64C 13/42* (2006.01)
*B64C 27/82* (2006.01)

(52) U.S. Cl.
CPC ............ *B64C 13/506* (2018.01); *B64C 27/26* (2013.01); *B64C 27/56* (2013.01); *B64C 27/82* (2013.01); *B64D 31/04* (2013.01)

(56) References Cited

U.S. PATENT DOCUMENTS

| | | | | |
|---|---|---|---|---|
| 2010/0073363 | A1* | 3/2010 | Densham | G05B 17/02 345/419 |
| 2011/0140690 | A1 | 6/2011 | Antraygue | |
| 2012/0130565 | A1* | 5/2012 | Shirota | B64C 13/345 701/3 |
| 2013/0168501 | A1* | 7/2013 | Chaduc | B64C 13/503 244/227 |
| 2013/0221153 | A1* | 8/2013 | Worsham, II | B64C 27/006 244/17.13 |
| 2014/0021303 | A1* | 1/2014 | Salamat | B64C 13/507 244/231 |

FOREIGN PATENT DOCUMENTS

| | | | |
|---|---|---|---|
| WO | 2015181525 | A3 | 12/2015 |
| WO | 2016043943 | A2 | 3/2016 |
| WO | 2016043943 | A3 | 3/2016 |

* cited by examiner

ELECTRIC CONTROL MEMBER, A ROTARY WING AIRCRAFT, AND A METHOD

CROSS-REFERENCE TO RELATED APPLICATIONS

This application claims priority to French patent application No. FR 16 01481 filed on Oct. 12, 2016, the disclosure of which is incorporated in its entirety by reference herein.

BACKGROUND OF THE INVENTION

(1) Field of the Invention

The present invention relates to an electric control member, to a rotary wing aircraft including such a control member, and to a method applied by the aircraft.

2) Description of Related Art

A rotary wing aircraft of helicopter type has at least one main rotor that contributes to providing the aircraft with at least part of its lift and propulsion.

In addition, there is a system that serves at least to control the yaw movement of the aircraft.

Under such circumstances, such a helicopter has three piloting axes. A first axis consists in using a first control to control the magnitude of the lift vector of the aircraft. A second axis consists in using a second control to control the orientation of the lift vector, and a third axis consists in using a third control to control the yaw movement of the aircraft.

By way of example, a helicopter may have a main rotor contributing to its propulsion and to its lift. Furthermore, a helicopter may have an auxiliary rotor contributing at least to controlling yaw movement.

Under such circumstances, a collective pitch lever makes it possible to control the pitch of the blades of the main rotor collectively in order to adjust the lift of the aircraft. A cyclic stick serves to control the pitch of the blades of the main rotor cyclically in order to adjust the orientation of the lift vector of the aircraft. Finally, pedals serve to adjust the pitch of the blades of the auxiliary rotor collectively in order to control the yaw movement of the helicopter.

In another embodiment, a helicopter may have two main rotors, possibly on a common axis.

Under such circumstances, a collective pitch lever can serve to control the pitch of the blades of the main rotors collectively in order to adjust the lift of the aircraft. A cyclic stick can serve to control the pitch of the blades of the main rotors cyclically in order to adjust the orientation of the lift vector of the aircraft. Finally, pedals may serve to adjust the torque exerted by at least one main rotor on the fuselage of the aircraft in order to control the yaw movement of the aircraft by applying different torques.

Another type of rotary wing aircraft, known for convenience as a "hybrid", has at least one rotor that contributes at least in part to providing the aircraft with lift and propulsion. The aircraft also has a device for controlling its yaw movement. Furthermore, the aircraft has a system suitable, at least in the forward direction of the aircraft, for exerting thrust referred to for convenience as "additional" thrust. This additional thrust is said to be "additional" insofar as this thrust is axially independent of the thrust exerted by the rotary wing.

In addition to the three usual piloting axes, such a hybrid rotary wing aircraft has a fourth piloting axis. This fourth piloting axis consists in using a fourth control to control the magnitude of the additional thrust.

For example, a hybrid rotary wing aircraft may have a main rotor that contributes at least in part to providing the aircraft with lift and with propulsion. In addition, the hybrid rotary wing aircraft has a propulsion system with two propellers contributing at least in part to propelling the aircraft and to controlling the yaw movement of the aircraft.

A collective pitch lever may serve to control the pitch of the blades of the main rotor collectively in order to adjust the magnitude of the lift vector of the aircraft. A cyclic stick serves to control the pitch of the blades of the main rotor cyclically in order to adjust the orientation of the lift vector of the aircraft.

In addition, a thrust control may enable a pilot to adjust the mean pitch of the blades of the propellers collectively in order to control the additional thrust generated jointly by the propellers.

Furthermore, pedals can serve to adjust the way this additional thrust is shared between the two propellers in order to control the yaw movement of the aircraft by applying different thrusts with each of the propellers. By way of example, the propellers may serve to adjust a differential pitch, the pitch of the blades of one propeller being equal, by way of example, to the sum of the mean pitch plus half of the differential pitch, while the pitch of the blades of the other propeller is equal, by way of example, to the difference between the mean pitch and half of the differential pitch.

Thrust control may be in the form of an on/off control. When the thrust control is manipulated, said thrust control generates an order to increase or to reduce the mean pitch of the blades of the propellers. This order is transmitted to actuators in order to modify the pitch of the blades of both propellers in the same way. For example, an actuator is arranged on a mechanical linkage that controls a hydraulic valve, the hydraulic valve feeding a hydraulic actuator suitable for generating a movement of the blades of a propeller.

Such a thrust control is advantageous. Nevertheless, modifying the mean pitch of the blades can be too slow in order to be able to request a rapid increase in the power developed by the power plant driving the propellers, or indeed too fast in order to have fine control over the forward speed of the aircraft, e.g. when flying in the proximity of other aircraft.

Furthermore, a flight control that is independent of the thrust control can position the blades of the propellers in a predetermined position, in particular during a stage of flight in autorotation.

An emergency mechanical control may also be provided to enable the propellers to be controlled in the event of the thrust control malfunctioning. The mechanical control may comprise a mechanical lever suitable for mechanically moving said mechanical linkage that controls a hydraulic valve.

Furthermore, aircraft known under the trademarks Bell V-22® and Agusta Westland AW609® are fitted with tilting rotors. Commands enable the longitudinal thrust of the aircraft to be controlled by causing nacelles carrying rotors to tilt, thereby providing a transition between a "helicopter" mode of operation and an "airplane" mode of operation. Nevertheless, that situation is remote from the problems encountered when controlling the propellers of a hybrid rotary wing aircraft.

Patent WO 2016/043943 A2 returns to the concept of on/off control for varying the pitch of the propulsion propeller or propellers while adding the possibility of requesting zero thrust from the propulsion propeller(s).

Document FR 2 984 004 describes a rotary control device having a control wheel, and a return device tending to return the wheel into a neutral position. An indexing device serves to hold the wheel in at least one position relative to a support. The control device also has a printed circuit with a sensor for detecting a movement of the wheel.

Document FR 2 984 004 is remote from the invention since it does not involve controlling an additional thrust in a hybrid rotary wing aircraft.

Document WO 2015/181525 and Document US 2011/140690 are also known.

Document WO 2015/181525 describes an electric control device having manipulation means and a support. The control device includes a sensor for measuring a current position of the manipulation means and it also has a force sensor.

Document US 2011/140690 describes an electric control device having manipulation means and a support. The control device includes a sensor for measuring a current angular position of the manipulation means.

BRIEF SUMMARY OF THE INVENTION

An object of the present invention is thus to propose a novel control device capable in particular of being used for controlling a thrust of an aircraft.

The invention thus relates to an electric control device having manipulation means and a support, the manipulation means being movable relative to the support, the manipulation means being for being moved relative to the support by a person, the electric control device including a first measurement system that takes a first measurement of a current position of the manipulation means relative to a neutral position.

The electric control device comprises a second measurement system that takes a second measurement of the current position, the first measurement system and the second measurement system being independent and dissimilar, the control device including a processor unit comparing the first measurement and the second measurement in order to generate a control signal as a function of said current position, the processor unit considering the manipulation means to be in the neutral position when the first measurement and the second measurement do not correspond to the same position for the manipulation means.

Under such circumstances, an audible and/or visual alert that a failure has been detected can be issued by the processor unit.

The term "manipulation means" is used to designate a member that can be manipulated by a person. In particular, this term designates a movable member of an electric switch. For example, the manipulation means may comprise a wheel that is movable in rotation relative to the support, a lever, . . .

The terms "first measurement" and "second measurement" represent data that varies as a function of the position of the manipulation means relative to a reference. For example, the angular position of a wheel relative to a reference is measured via the first measurement and via the second measurement. Under such circumstances, for two different positions of the manipulation means, each of the first and second measurements ought to have two different values.

The term "independent and dissimilar" means that the first measurement system and the second measurement system generate signals of different kinds, even though both signals relate to the position of the manipulation means. The first measurement and the second measurement represent different data, even though they are both representative of the position of the manipulation means. For example, the first measurement renders the position of the manipulation means in the form of an electric current possessing a certain voltage, whereas the second measurement renders the position of the manipulation means in the form of a binary value.

Thus, the invention does not use a single measurement system for measuring the position of the manipulation means.

On the contrary, the electric control device has two dissimilar measurement systems, each measuring the position of the manipulation means.

The first measurement and the second measurement may pass via two different paths in order to reach the processor unit. The first measurement and the second measurement are compared in order to verify that the measurement systems are operating correctly.

For example, each measurement may be associated with a respective order that is to be given. If the first measurement and the second measurement relate to two different orders, then the processor unit deduces the presence of inconsistency.

Alternatively, each value of the first measurement may be associated with a theoretical value that ought to be reached by the second measurement. The processor unit then determines whether the second measurement corresponds to the stored theoretical value. If not, the processor unit deduces the presence of inconsistency.

In the event of inconsistency, the processor unit deduces that a measurement system has failed. Under such circumstances, the processor unit generates a stored predetermined control signal corresponding to the neutral position of the manipulation means. The processor unit then ignores the information delivered by the first and second measurement systems.

In the event of inconsistency, an invalidity state may also be generated in order to determine whether a signal corresponding to the neutral position has been sent as a result of inconsistency or as a result of the manipulation means being put into this neutral position.

Alternatively, the processor unit may generate a control signal corresponding to the most recent consistent measurement.

In the event of inconsistency, an invalidity state may also be generated.

In the absence of inconsistency, the processor unit generates the predetermined and stored control signal corresponding to the first measurement and to the second measurement.

This characteristic makes it possible to obtain a device seeking to prevent common modes of failure, so as to achieve an optimized level of reliability and safety. Thus, the electric control device is suitable for controlling a major function of the aircraft, such as the longitudinal thrust of a hybrid rotary wing aircraft.

For example, the first measurement and the second measurement may be taken into account for controlling actuators that act on the longitudinal thrust of an aircraft using an architecture of the command (COM) and monitoring (MON) type in which the measurements prepared by two independent channels need to be in agreement for the action to be undertaken, with the actuator(s) freezing any action in the event of the received measurements not being similar.

The availability of measurements that are independent and dissimilar makes it possible, by downstream software processing via two independent calculation channels, to passivate the malfunction of one of the measurements without giving rise to an unwanted command.

Furthermore, the electric control device can include one or more of the following characteristics.

Thus, the first measurement system may comprise means delivering the first measurement in the form of a first signal of analog type, the second measurement system comprising means delivering the second measurement in the form of a second signal of digital type.

The first measurement system can thus send an analog signal. Under such circumstances, the first measurement may have the form of an electric current presenting a voltage that varies as a function of the position of the manipulation means, e.g. over a range of 0 volts (V) to 12 V.

Conversely, the second measurement system delivers a digital signal. The second measurement may thus be a digital measurement, e.g. of the "reflected binary" type. Specifically, the second measurement system may apply a Gray code.

For example, the first measurement system may comprise a potentiometer or a Hall effect sensor or an active electrical sensor for sensing rotary movements, the first measurement being expressed in the form of a first signal presenting a voltage that depends on said current position.

One active electric sensor of rotary movements is known under the acronym RVDT, which corresponds to the term rotary variable differential transformer.

Furthermore, the second measurement system may comprise a code wheel constrained to rotate with the manipulation means and a processor system co-operating with the code wheel in order to determine a current binary value corresponding to said current position, the second measurement being expressed in the form of a second signal comprising said binary value.

The processor system may be a conventional optical or magnetic system.

A code wheel generates a pure binary code. A code wheel makes it possible to deliver a digital signal that depends on the movement made by the code wheel.

For example, the code wheel is in the form of a perforated wheel. The processor system generates a light beam that illuminates a measurement face of the wheel. Depending on the position of the wheel, the light beam passes through the wheel through a perforation, in which case it reaches a sensor, or else it is interrupted against the measurement face of the wheel. When a sensor detects the presence of a beam, the sensor issues an electric signal.

By way of example, and in order to obtain a three-bit digital signal, it is possible to use three beams and three sensors. A binary signal having some other number of bits could be envisaged, e.g. a binary signal having four bits.

The degree of rotation of a code wheel may be encoded using the Gray code. The Gray code, also known as "reflected binary" serves to change only one bit at a time when a number is increased by unity, thereby avoiding potentially troublesome transient states.

In another aspect, the electric control device may include a return system tending to return the manipulation means to the neutral position.

The return system may comprise springs or miniature gas actuators associated with mechanical abutments preventing them from acting beyond a return to the neutral position.

The return system tends to return the manipulation means mechanically into the neutral position and to hold them there. Consequently, when a person moves the return means, the person exerts a force against the force exerted by the return system. When the person releases the manipulation means, the return system moves the manipulation means towards the neutral position.

Under such circumstances, a malfunction of the return system does not lead to unwanted rotation of the manipulation means, and this can be most advantageous when the electric control device is controlling a sensitive system of an aircraft.

For example, the return system may comprise a first spring and a second spring that are provided respectively with a first movable end and with a second movable end, said manipulation means having an element that is arranged circumferentially between the first movable end and the second movable end, said return system including an abutment, said first spring tending to move said first movable end circumferentially against the abutment in a first direction in order to position the manipulation member in the neutral position, said second spring tending to move said second movable end circumferentially against the abutment in a second direction in order to position the manipulation member in the neutral position.

In another aspect, the electric control device may include a retention system tending to retain said manipulation means in at least one "indexed" position relative to the support.

The retention system may be in the form of a notch system, e.g. having a bearing ball and a resilient member. The retention system may thus be of the type described in Document FR 2 984 004.

In alternative or additional manner, the retention system may be a friction system. Such a friction system includes a member rubbing against the manipulation means in order to tend to retain the manipulation means in a position.

The retention system may define a plurality of switch positions in which the manipulation means may be found relative to the support, each position theoretically giving rise to measurements that are different both for the first measurement and for the second measurement.

The retention system tends to retain the manipulation means in each position. When a return system is present, the return system delivers a return force to the manipulation means that is greater than the holding force exerted by the retention system. Thus, the retention system serves to ensure that the manipulation means are held in position in the event of the return system breaking. A malfunction of the mechanical return system in the neutral position therefore does not lead to unwanted rotation of the manipulation means, even in the presence of vibration and in particular in an aircraft cockpit, because of the action of the retention system.

In another aspect, the electric control device may present a first assembly provided with the support together with the manipulation means and the first and second measurement systems, said processor unit being attached to the first assembly and being secured to the support, said processor unit being for connecting to at least one computer that is physically independent from the first assembly, said processor unit transmitting said control signal to the computer, said control signal relating to a parameter of value that is established as a function of a measured position of the manipulation means when the first measurement and the second measurement both correspond to said measured position, or to said neutral position when the first measurement and the second measurement do not correspond to the same position of the manipulation means.

The control signal may also include validity information. Under such circumstances, the control signal can indicate whether an order relating to said neutral position is an order that has been given voluntarily or an order that results from inconsistency.

In this first variant, the manipulation means, the first measurement system, the second measurement system, and the processor unit comparing the measurements are incorporated in a single piece of equipment suitable for transmitting a control order to at least one computer of an autopilot system via at least one bus, e.g. of the CAN type. The electric control device can then be incorporated easily in an aircraft, for example.

The acronym CAN corresponds to the term "controller area network" and it specifies a particular type of bus.

By way of example, the processor unit may be in the form of a programmable logic circuit. A programmable logic circuit is a logic integrated circuit that can be reprogrammed after it has been fabricated. Such an array has numerous individual logic cells and logic bistables that can be freely interconnected. A programmable logic circuit may be in the form of an electronic component known as a "field-programmable gate array" (FPGA).

By way of example, the processor unit generates and transmits the control signal to the computer of an autopilot system for controlling the propulsion system of an aircraft.

In a second variant, the electric control device presents a first assembly provided with the support together with the manipulation means and the first and second measurement systems, said processor unit not being attached to the first assembly, the processor unit being remote from the first assembly, said processor unit being connected to the first assembly optionally by at least one bus, said bus being connected to the first measurement system and to the second measurement system, said processor unit transmitting said control signal to the computer, said control signal relating to a parameter of value that is established as a function of a measured position of the manipulation means when the first measurement and the second measurement both correspond to said measured position, or to said neutral position when the first measurement and the second measurement do not correspond to the same position of the manipulation means.

In this second variant, the manipulation means, the first measurement system, and the second measurement system are all incorporated in the same piece of equipment. This equipment is then connected to a remote processor unit, e.g. via a CAN bus or wired connections.

For example, the processor unit may be an integral portion of an autopilot system that controls a propulsion system of an aircraft.

In addition to an electric control device, the invention provides an aircraft having at least one main rotor contributing at least in part to providing the aircraft with lift, the aircraft including at least one propulsion system distinct from the main rotor, the propulsion system generating thrust referred to as "additional" thrust to contribute at least in part to causing the aircraft to advance.

The aircraft includes an electric control device of the invention, the electric control device being connected to the propulsion system to control said additional thrust, at least in part, the control signal requesting a variation rate for said additional thrust transmitted to the propulsion system.

For example, the manipulation means are mounted on a collective pitch lever controlling the pitch of the blades of the main rotor collectively.

In addition, the propulsion system may comprise at least one propeller, together with a pitch modification system for modifying the pitch of the blades of the propeller.

Under such circumstances, and depending on the variant, the processor unit may be connected to an autopilot system for the propulsion system, or may be a portion of such an autopilot system, being connected to the pitch modification system that acts on the pitch of the blades of the propellers.

Independently of the variant, manipulating the manipulation means does not cause an on/off control to be generated solely for increasing or reducing the additional thrust. Specifically, manipulating the manipulation means leads to a control signal being generated for controlling a rate of variation of the additional thrust.

The rate of variation may be directly a rate of variation of the additional thrust, e.g. expressed in watts per second, or else it may be a rate of variation of the pitch of the blades of the propellers generating said thrust and expressed in degrees of pitch per second.

The electric control device thus enables the speed with which the additional thrust is varied to be controlled finely.

The aircraft may also include one or more of the following characteristics.

Thus, and in one variant, the propulsion system comprises at least one propeller having a plurality of variable pitch blades, and the propulsion system includes a pitch modification system for modifying said pitch, the processor unit being connected to the pitch modification system.

In another aspect, the aircraft may include an emergency electric manipulation member connected to the propulsion system, in order to request a zero rate of variation for the additional thrust or in order to position the mean pitch of the blades of the propellers in a predetermined position. Positioning the blades of the propellers in a refuge position serves to optimize the workload on the pilot.

This emergency electric manipulation member may have priority over the electric control device and it should be independent of the manipulation means, with the manipulation means being inhibited when the emergency electric manipulation member is manipulated.

In order to avoid untimely application of the emergency electric manipulation member, it is possible to make use of a mechanical device for protecting the manipulation means. An avionics control may also be used for removing inhibition from the function.

Depending on the variant, the emergency electric manipulation member may be connected to a computer communicating with the processor unit, or indeed to the processor unit.

The emergency electric manipulation member may be used during stages of flight in autorotation, or in the event of the manipulation means jamming.

Using the emergency electric manipulation member makes it possible to override the control received from the manipulation means and to impose a return towards a refuge thrust control position.

In another aspect, the aircraft may include an emergency mechanical manipulation member connected to the propulsion system.

For example, the emergency mechanical manipulation member may be in the form of a lever acting on a power transmission drive connected to a servo-control controlling the additional thrust, e.g. by controlling the pitch of the blades of a propeller.

The invention also provides a method of controlling a propulsion system of an aircraft.

The method comprises the following steps:

generating the first measurement and the second measurement;

comparing the first and second measurements; and generating a variation rate, for the additional thrust or for the pitch of the blades of the propulsion system, in order to control the additional thrust as a function of the position of said manipulation means relative to a reference, said variation rate being generated as a function of a "measured" position of the manipulation means when the first and second measurements correspond simultaneously to said measured position of the manipulation means, said variation rate being set at zero when the first measurement and the second measurement do not correspond to the same position of the manipulation means.

In the event of inconsistency between the first measurement and the second measurement, a visible or audible alarm may be issued by an alarm system.

The method may also include one or more of the following steps.

By way of example, the step of comparing the first and second measurements may comprise the following stages:

determining a first variation rate corresponding to the first measurement by using a relationship giving said first variation rate as a function of the first measurement;

determining a second variation rate corresponding to the second measurement by using a relationship giving said second variation rate as a function of the second measurement; and comparing the first and second variation rates.

Alternatively, the method may compare the first measurement with a theoretical value for the second measurement.

By way of example, when the first measurement presents a voltage lying respectively in one of the following ranges 10.285 volts (V) to 12 V, 8.571 V to 10.285 V, 6.857 V to 8.571 V, 5.142 V to 6.857 V, 3.428 V to 5.142 V, 1.714 V to 3.428 V, or 0 V to 1.714 V, the second measurement ought to present a binary value that is respectively equal to 001, 011, 010, 110, 111, 101, 100.

If this is not true, the rate of variation is considered as being zero.

If this is true, the rate of variation is equal to the rate of variation corresponding to the value of the first measurement or of the second measurement. For example, the rate of variation may be equal to the rate of variation corresponding to the value of the first measurement, with the second measurement serving to monitor the system.

Independently of the implementation, the processor unit may thus apply at least one relationship stored in the processor unit in order to compare the first measurement with the second measurement. A relationship may be in the form of one or more mathematical relationships or indeed in the form of a table of values, for example.

In another aspect, the method may include a step of positioning a mean pitch for the blades of each propeller in a predetermined position when the emergency electric manipulation member is manipulated by a pilot.

In another aspect, said propulsion system may comprise at least one propeller having a plurality of variable pitch blades, said propulsion system may include a pitch modification system for modifying said variable pitch, said variation rate being a variation rate for said pitch of said blades of the propeller, and said method including a step of modifying said pitch by applying said variation rate of said pitch.

BRIEF DESCRIPTION OF THE DRAWINGS

The invention and its advantages appear in greater detail from the context of the following description of embodiments given by way of illustration and with reference to the accompanying figures, in which.

DETAILED DESCRIPTION OF THE INVENTION

Elements present in more than one of the figures are given the same references in each of them.

Figure 1:
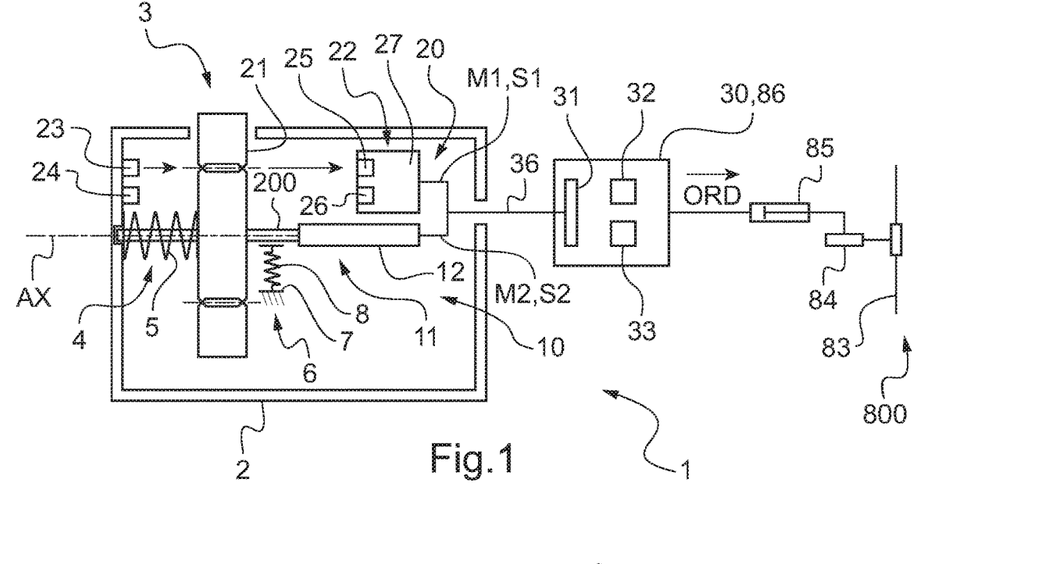
FIGS. 1 to 5 are diagrams showing an electric control device of the invention.

FIG. 1 shows an electric control device 1.

The electric control device 1 has a support 2 carrying manipulation means 3. The manipulation means 3 are connected to the support 2 by an attachment system that imparts freedom of movement to the manipulation means 3 relative to the support 2.

For example, the manipulation means 3 may comprise a control wheel that is rotatable about a manipulation axis AX that is stationary relative to the support 2. The attachment system may then be in the form of a rod 200 secured to the wheel and carried by bearings secured to the support 2.

Such a wheel may have a circumference provided with grip means in order to make it easy for a person to move by manual action. The wheel may be of the type described in Document FR 2 984 004.

Furthermore, the electric control device 1 may be provided with a return system 4. Such a return system 4 serves to urge the manipulation means 3 into a reference position referred to as the "neutral" position POS1.

By way of example, such a return system 4 may comprise at least one spring 5 or at least one gas actuator.

Figure 2:
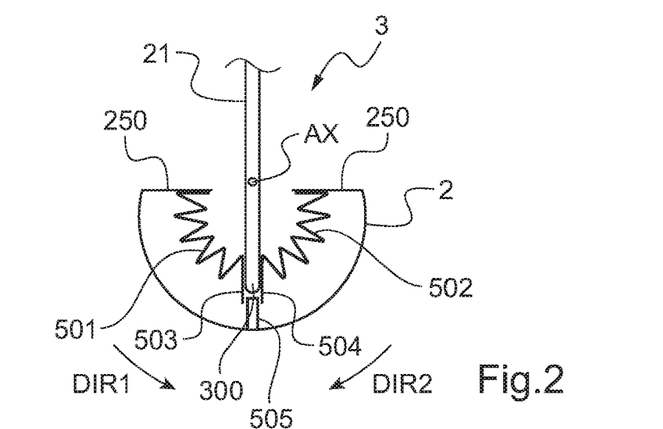

FIG. 2 shows rotary manipulation means 3. The manipulation means 3 comprises an element 300 that is held circumferentially between two movable ends of two springs 501 and 502 of the return system.

Thus, a first spring 501 extends in a first direction DIR1 over a circular arc from a seat 250 secured to the support 2 to a first movable end 503. Likewise, the second spring 502 extends in a second direction DIR2, opposite to the first direction DIR1, over a circular arc from a seat 250 secured to the support 2 to a second movable end 503.

In addition, the return system 4 includes an abutment 505. The abutment 505 has a first contact face suitable for blocking extension in the first direction DIR1 of the first spring 501 by interfering with the first movable end 503, and a second contact face suitable for blocking extension of the second spring 502 in the second direction DIR2 by interfering with the second movable end 504. By way of example, the abutment is in the form of a shoulder of the support 2.

This abutment is also located in register with the position that the element 300 is to reach in the neutral position.

Consequently, after the manipulation member has been turned in the second direction DIR2, the element 300 tends to compress the first spring 501. When a pilot no longer exerts any force on the manipulation member 3, the first spring 501 extends and repositions the manipulation member 3 in its neutral position, even in the event of the second spring 502 failing, since turning of the manipulation member stops when the first movable end 503 reaches the abutment 505.

Conversely, after the manipulation member has been turned in the first direction DIR1, the element 300 tends to compress the second spring 502. When the pilot no longer exerts any force on the manipulation member 3, the second spring 502 extends and repositions the manipulation member 3 in its neutral position, even in the event of failure of the first spring 501, since turning of the manipulation member 3 stops when the second movable end 504 reaches the abutment 505.

In another aspect, and with reference to FIG. 1, the electric control device 1 may include a retention system 6. The function of the retention system 6 is to tend to retain the manipulation means 3 in at least one position relative to the support 2 that is referred to as an "index" position.

Specifically, the manipulation means 3 may be positioned in a plurality of distinct indexed switch positions that are different from the neutral position. The retention system 6 then tends to hold the manipulation means 3 in each switch position.

Figure 3:
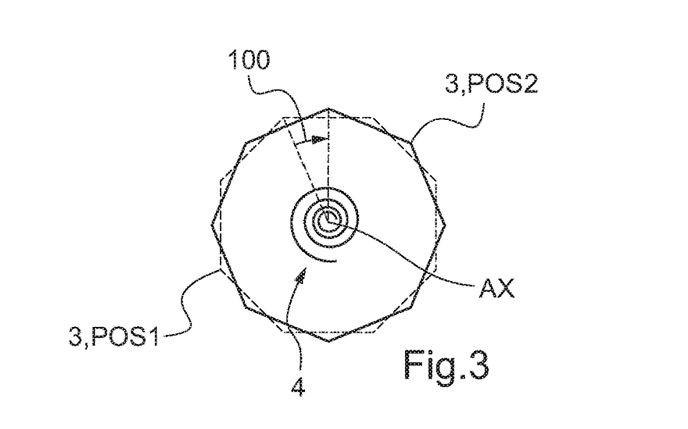

With reference to FIG. 3, a person then moves the manipulation means 3 from the neutral position POS1 towards a current position POS2 in order to give an order to a system, such as a propulsion system of an aircraft.

The manipulation means 3 in this example then turns through an angle 100 about its manipulation axis AX.

The angular position of the manipulation means 3 relative to the neutral position then determines the order given by the electric control device 1 to a system.

When the person releases the manipulation means 3, the return system 4 returns the manipulation means 3 to the neutral position POS1. In the event of the return system malfunctioning, the retention system tends to maintain the manipulation means in the position it has reached.

In the example of FIG. 1, the retention system 6 may be in the form of a friction system. By way of example, such a friction system may comprise a resilient member 7 tending to press a shoe 8 against a member that is constrained to rotate with the manipulation means 3.

Alternatively, a notched system may be envisaged, such as a system comprising a bearing ball and housings arranged in a ring of the manipulation means 3. A resilient member then tends to position a ball in a housing.

With reference to FIG. 1, the electric control device 1 includes two measurement means, each measuring the position of the manipulation means.

Thus, the electric control device 1 has a first measurement system 10 that takes a first measurement representing the current position of the manipulation means 3. The first measurement system 10 is attached to the support 2.

Furthermore, the electric control device 1 has a second measurement system 20 that takes a second measurement that also represents the current position POS2.

The first measurement system 10 and the second measurement system 20 are independent and dissimilar. Each measurement system then takes a measurement independently of the other measurement system.

For example, the first measurement system 10 comprises means delivering the first measurement in the form of a first signal S1 of analog type.

As shown in FIG. 1, such a first measurement system 10 comprises a potentiometer 11 incorporated in an electronic circuit 12. A movement of the manipulation means 3 leads to a variation in the resistance of the potentiometer 11. Under such circumstances, the electronic circuit 12 delivers a first measurement M1 in the form of a first electric signal S1 having a voltage that depends on the position of the manipulation means 3.

For example, the first measurement M1 is in the form of a first signal S1 presenting a voltage lying in one of the following ranges 10.285 V to 12 V, 8.571 V to 10.285 V, 6.857 V to 8.571 V, 5.142 V to 6.857 V, 3.428 V to 5.142 V, 1.714 V to 3.428 V, or 0 V to 1.714 V, as a function of the position of the manipulation means 3 and thus of the position of the movable terminal of the potentiometer 11.

As an alternative to a potentiometer, the first measurement system could comprise a Hall effect sensor or an RVDT.

Furthermore, the second measurement system 20 may deliver the second measurement M2 in the form of a second signal S2 that is not analog but is rather of digital type. The second measurement system 20 is attached to the support 2.

For example, the second measurement system 20 includes a code wheel 21. Furthermore, the second measurement system 20 includes a processor system 22 that co-operates with said code wheel 21 in order to determine a current binary value that corresponds to said current position POS2.

The code wheel 21 is constrained to rotate with the manipulation means 3. For example, the code wheel may be in the form of a body of a wheel of the manipulation means. The body may include angular perforations for generating a binary value.

Under such circumstances, the processor system may include light beam generators 23, 24, one sensor 25, 26 per light beam generator 23, 24, and a calculation unit 27. FIG. 1 shows two light beam generators. Nevertheless, the processor system may have one light beam generator per signal bit that is to be produced.

When the beam passes through a perforation and reaches a sensor, the processor system can give the corresponding bit in the second measurement the value 1. Conversely, if no perforation is in register with a beam so that the sensor is not reached, then the processor system can give the corresponding bit the value 0.

For example, the second measurement M2 is in the form of a second signal S2 having a 3-bit binary value equal respectively to 001, 011, 010, 110, 111, 101, or 100, as a function of the position of the manipulation means 3.

In order to analyze the measurements, the electric control device 1 includes a processor unit 30.

The processor unit 30 may have an input 31 receiving the first signal S1 and the second signal S2 respectively conveying the first measurement M1 and the second measurement M2.

Furthermore, the processor unit 30 may have at least one output for sending a control signal ORD to a system. In addition, and by way of example, the processor unit 30 may include a processor 32 executing instructions stored in a memory 33.

Advantageously or in addition, the processor unit may comprise an integrated circuit, a programmable system, or a logic circuit, these examples not being limiting on the scope to be given to the term "processor unit".

Independently of its embodiment, the processor unit 30 serves to compare the first measurement M1 with the second measurement M2 in order to generate a control signal ORD.

The processor unit 30 takes the manipulation means 3 to be in the neutral position POS1 when the first measurement and the second measurement do not both correspond to the same position of the manipulation means, possibly to within some threshold tolerance. The processor unit then generates a predetermined control signal ORD corresponding in particular to the neutral position.

Conversely, when the first measurement and the second measurement correspond to the same particular position for the manipulation means 3, the processor unit then generates a predetermined control signal ORD that corresponds specifically to that particular position.

In the first variant of FIG. 1, the processor unit is situated outside a first assembly provided with the support 2 and the manipulation means 3 and also with the first measurement system 10 and the second measurement system 20.

Unlike the manipulation means 3, the first measurement system 10, and the second measurement system 20, the processor unit 30 is not attached to the support 2. The processor unit is thus remote from the first assembly.

Under such circumstances, the first measurement system 10 and the second measurement system 20 may be connected by way of example to at least one bus 36 leading in particular to the processor unit 30. Such a bus 36 may be a CAN bus.

By way of example, the processor unit 30 is a portion of a computer 86 of an autopilot system controlling the pitch of the blades 83 of at least one propeller 800.

Figure 4:
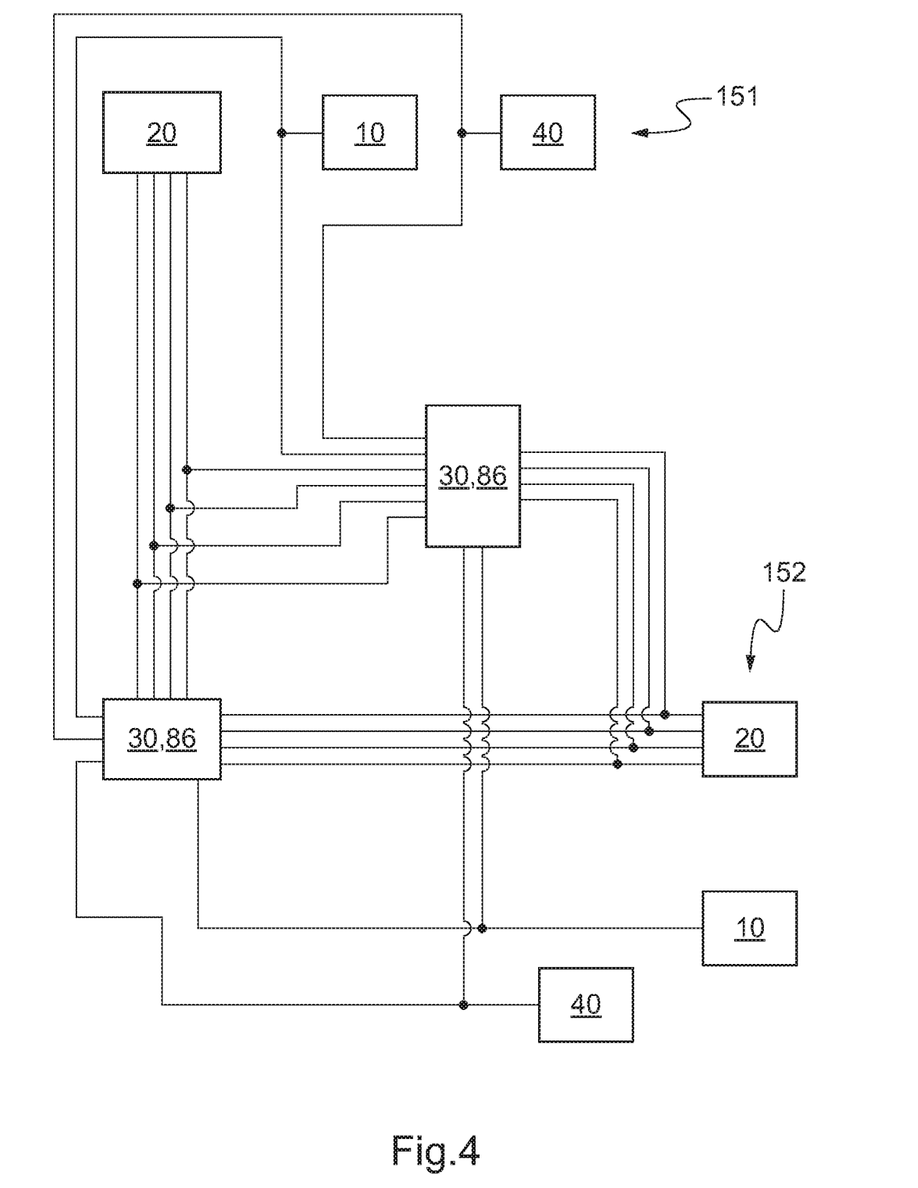

In an alternative as shown in FIG. 4, the first measurement system 10 and the second measurement system 20 are connected to a plurality of processor units 30, for example.

FIG. 4 shows an architecture having two control devices 151 and 152, e.g. for use respectively by a pilot and by a copilot.

Each control device has first measurement means 10, second measurement means 20, and a processor unit 30. Such a processor unit may comprise a computer.

By way of example, such a computer may be a dual computer having two channels. Each of the channels has its own microprocessor. One of the two channels may serve to generate the command COM that may be inhibited as a result of detecting inconsistency as a result of communication with the first channel and the second channel.

Under such circumstances, each measurement means 10, 20 is connected to each processor unit by two connections. The connections shown are wired connections, but they could comprise buses, and in particular CAN buses.

The processor units may also be connected to each other.

Figure 5:
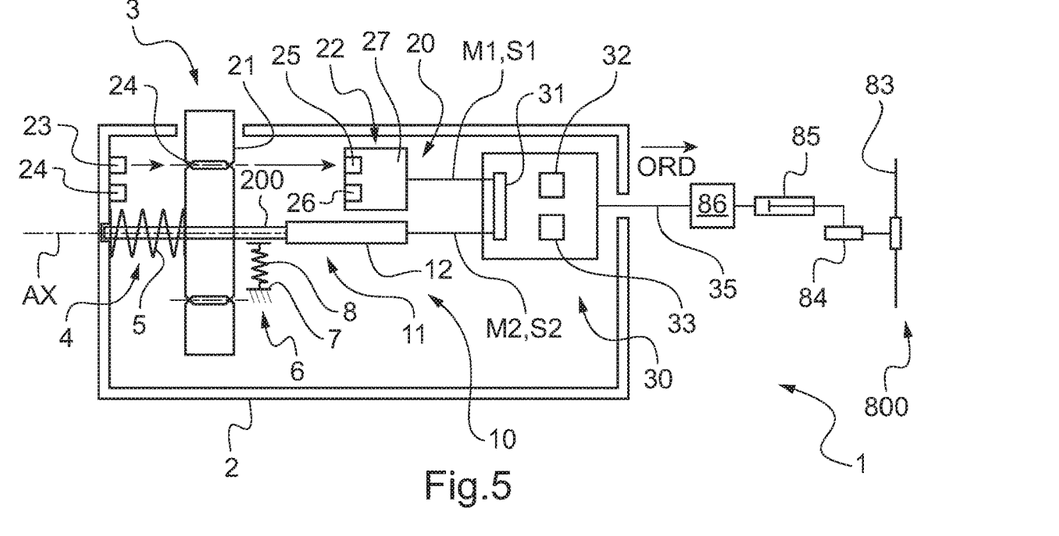

In the second variant of FIG. 5, the processor unit 30 is a portion of the first assembly since it is attached to the support 2. For example, the processor unit 30 may be in the form of a field programmable gate array (FPGA) logic circuit.

The processor unit 30 is thus connected to the first measurement system 10 and to the second measurement system 20. Furthermore, the processor unit 30 may be connected to the system that is to be controlled, e.g. by means of at least one bus 35, such as a CAN bus. For example, the processor unit 30 is connected by at least one CAN bus to at least one computer 86 of an autopilot system controlling the pitch of the blades 83 of at least one propeller 800.

By way of example, with a duplex architecture, the processor unit 30 may be connected by two CAN buses to two computers 86, each computer co-operating with a monitoring unit.

The processor unit 30 may also be connected by two channels to a dual computer 86. Even though monitoring is possible between two computers of a duplex architecture, it may take place between two dual channels of a single computer.

Furthermore, the processor unit sends a control signal via each bus 35 to each computer 86. Nevertheless, the processor unit can also transmit the first measurement and the second measurement to the computer, or indeed the result of the comparison that it makes. Thus, the computer can verify that the control signal ORD that is sent is correct by carrying out the same comparison as the processor unit.

Figure 6:
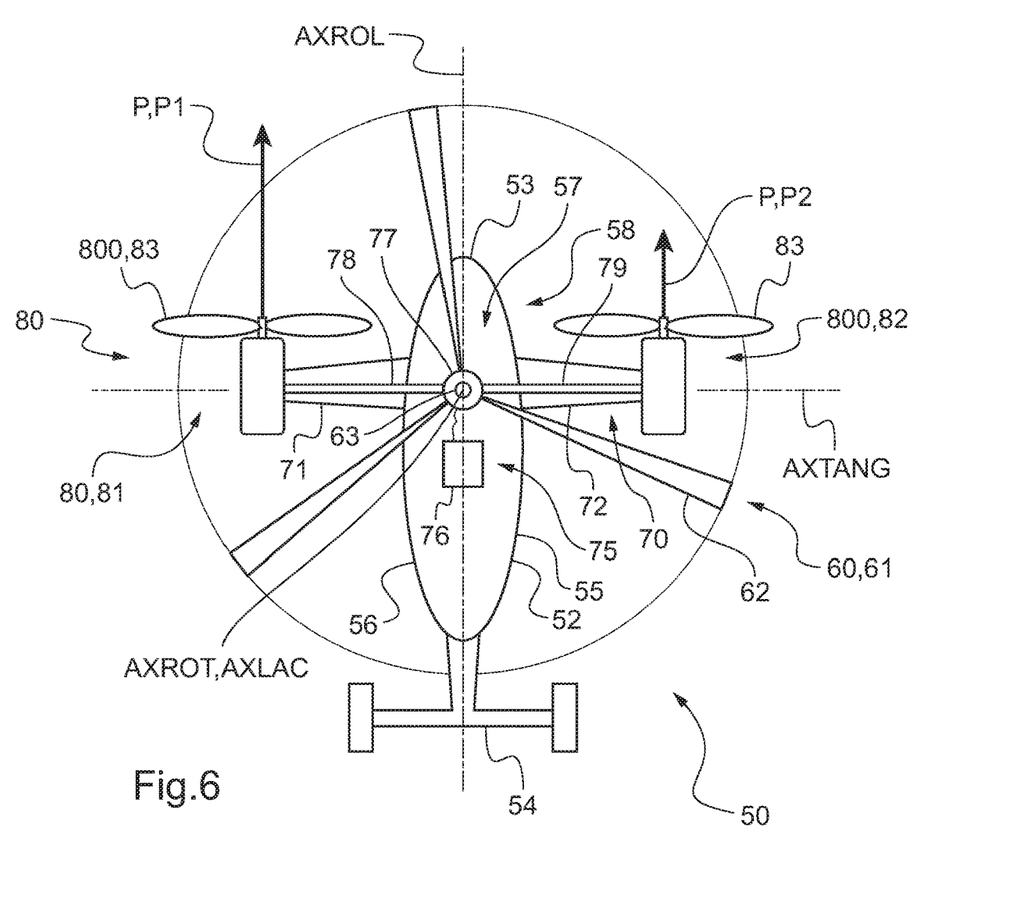
FIG. 6 is a view of an aircraft of the invention.

With reference to FIG. 6, the electric control device 1 of the invention may be arranged on a rotary wing aircraft, namely a rotorcraft 50.

The rotorcraft 50 has a fuselage 52. The fuselage 52 extends longitudinally from a tail 54 to a nose 53 along a roll axis AXROL. The fuselage also extends transversely from a first flank, referred to for convenience as the "left" flank 56 to a second flank, referred to for convenience as the "right" flank 55, along a pitching axis AXTANG. Finally, the fuselage extends in elevation from a bottom surface 58 towards a top surface 57 along a yaw axis AXLAC.

The roll axis AXROL and the yaw axis AXLAC together define a vertical anteroposterior plane of symmetry of the rotorcraft 1.

Conventionally, landing gear may project downwards from the bottom surface 58 of the fuselage.

The rotorcraft has a rotary wing 60 comprising at least one main rotor 61. The main rotor 61 overlies the top surface 57 of the fuselage 52. The main rotor 61 is provided with a plurality of blades 62, e.g. connected to a hub 63. For convenience, the blades 62 are said to be "main" blades.

The main rotor rotates about an axis referred to as the "main" axis of rotation AXROT in order to contribute at least in part to providing the rotorcraft with lift and possibly also with propulsion. The main axis of rotation may be stationary relative to the fuselage 52.

Furthermore, the rotorcraft 1 may have a propulsion system 80 providing additional longitudinal thrust P for contributing to moving the rotorcraft. The propulsion system 80 may tend to push or to pull the rotorcraft.

The propulsion system 80 may comprise at least one propeller 800 having a plurality of variable pitch blades 83.

By way of example, the rotorcraft then has a lift surface extending substantially transversely on either side of the fuselage. The lift surface 70 may for example comprise a left half-wing 71 extending from the left flank 56 and a right half-wing 72 extending from the right flank 55.

The lift surface then carries a propeller 800 referred to as the "first" propeller 81 and a propeller 800 referred to as the "second" propeller 82. By way of example, the left half-wing 71 carries the first propeller 81 and the right half-wing 72 carries the second propeller 82. The first propeller 81 and the second propeller 82 are thus arranged transversely on opposite sides of the fuselage 52.

Each propeller produces respective thrust P1, P2 and together they generate the additional thrust P. The first thrust P1 generated by the propeller 81 may differ from the second thrust P2 generated by the second propeller 82 in order to control the yaw movement of the rotorcraft.

Furthermore, the rotorcraft 1 has a power plant 75 for driving the first propeller 81, the second propeller 82, and the main rotor 60.

Such a power plant 75 may include at least one end 76 and a drive train connecting the engine to the first propeller 81 and to the second propeller 82 and also to the main rotor 60.

For example, the drive train includes a main power transmission gearbox (MGB) 77 having a rotor mast driving rotation of the main rotor. Furthermore, the MGB may be connected to a first power transmission train 78 driving rotation of the first propeller 81. Likewise, the MGB may be connected to a second power transmission train 79 driving rotation of the second propeller 82.

Other architectures can be envisaged.

Figure 7:
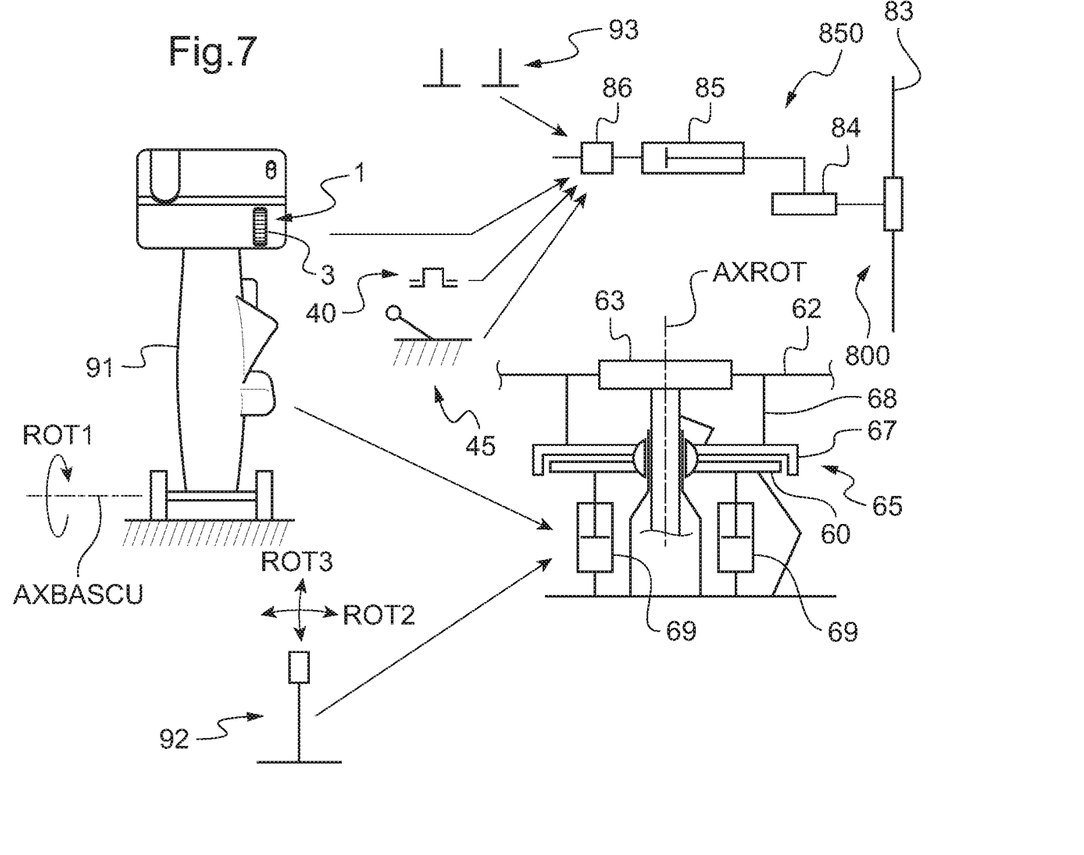
FIG. 7 is a diagram explaining the flight controls of the aircraft.

With reference to FIG. 7, the rotorcraft 50 has multiple flight controls for controlling the movement of the rotorcraft.

Specifically, the pitch of the blades of the main rotor can be modified both collectively and cyclically.

For example, the rotorcraft has a set of swashplates 65 comprising a non-rotary swashplate 66 and a rotary swashplate 67. The non-rotary swashplate 66 is connected to at least three actuators referred to as "main" actuators 69, e.g. of the servo-control type. The rotary swashplate 67 is connected to each of the blades 62 of the main rotor via a respective pitch rod 68.

Under such circumstances, the rotorcraft may include a collective pitch lever 91. This collective pitch lever 91 can be pivoted in rotation ROT1 about a pivot axis AXBASCU in order to control the main actuators in the same manner.

Furthermore, the rotorcraft may include a cyclic stick 92. The cyclic stick 92 can pivot in rotation ROT2 about a first axis and in rotation ROT3 about a second axis in order to control the main actuators in different manners in order to control the attitude of the rotorcraft.

Furthermore, the pitch of the blades 83 of each propeller 800 may be modified by a pitch modification system 850.

By way of illustration, the pitch modification system 850 for a propeller may comprise a hydraulic valve 84 hydraulically feeding an actuator. The actuator may be arranged in a hub of the propeller by means of a perforated long shaft. The hydraulic valve 84 may be controlled by a power transmission train including an electric actuator 85, for example. The electric actuator may be controlled by a computer 86.

Pedals 93 may communicate with the computer 86 in order to control the yaw movement of the aircraft by means of a difference in thrust between the first thrust exerted by the first propeller and the second thrust exerted by the second propeller.

In order to control the magnitude of the additional thrust, an electric control device 1 of the invention may be used. For example, the manipulation means 3 may be arranged on the collective pitch lever 91.

Under such circumstances, the control signal sent by the electric control device 1 may be a signal for controlling a rate of variation in the additional thrust. When a pilot manipulates the manipulation means 3, the electric control device 1 requests variation in the additional thrust at variation rate that may be negative or positive. The computer 86 then orders the pitch modification systems 850 of the propellers to modify the pitch of the blades of the propellers while applying this variation rate.

For example, the computer applies at least one mathematical relationship or interrogates a database in order to generate the orders for modifying the pitch of the propeller blades so as to match the pitch variation rate requested by the electric control device 1.

Specifically, the positioning of the pitch of the propellers may be servo-controlled firstly via generating a control signal that is transmitted to the computer 86, and secondly via a position sensor measuring information about the pitch of a blade. Such a position sensor may be connected to the computer 86. Furthermore, the position sensor may be arranged very close to the blades, e.g. at a hydraulic valve 84. The computer 86 then controls the electric actuator 85 in order to comply with the control signal received with respect to information returned by the position sensor.

Furthermore, the aircraft 50 may include an emergency electric manipulation member 40 connected to the propulsion system 80. For example, this emergency electric manipulation member 40 may be in the form of a pushbutton connected to the computer 86.

In another aspect, the aircraft 50 may include an emergency mechanical manipulation member 45 connected to the propulsion system. Such an emergency mechanical manipulation member 45 may comprise a lever that moves the electric actuator 85, for example.

Figure 8:
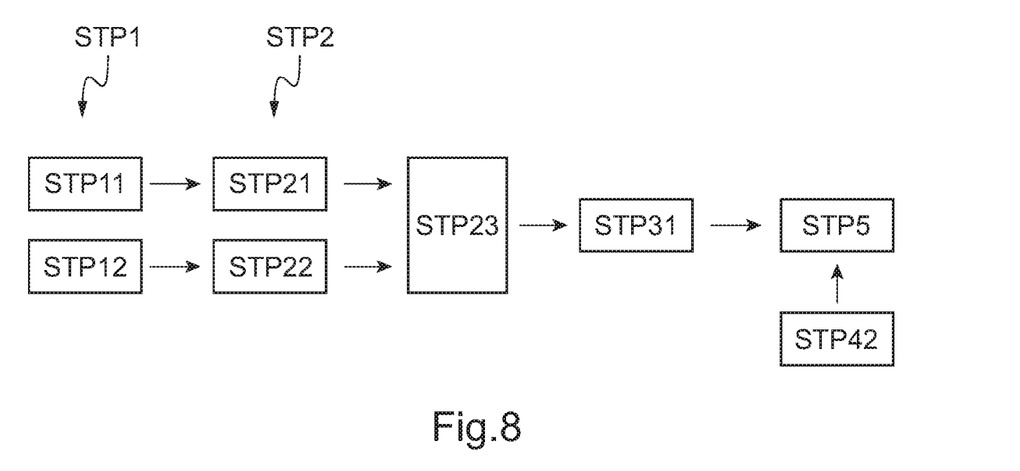
FIG. 8 is a diagram explaining the method of the invention.

FIG. 8 shows the method implemented by the aircraft.

During a first step STP1, the manipulation means 3 may be manipulated by a person to generate a modification to the additional thrust.

During a first measurement step STP11, the first measurement system generates the first measurement M1. During a second measurement step STP12, the second measurement system generates the second measurement M2.

During a comparison step STP2, the first and second measurements are compared with each other.

In one implementation, during a first stage STP21 of the comparison step STP2, a first variation rate relating to variation in the additional thrust corresponding to the first measurement is determined by using a first relationship giving the first variation rate as a function of the first measurement.

During a second stage STP22 of the comparison step STP2, a second variation rate, relating to a variation of the additional thrust corresponding to the second measurement, is determined by using a second relationship giving said second variation rate as a function of the second measurement.

Thereafter, the comparison is performed by comparing the first variation rate and the second variation rate during a comparison stage STP23. This comparison makes it possible to determine whether the first measurement and the second measurement correspond simultaneously to the same measured position for the manipulation means 3, or whether the first measurement and the second measurement do not correspond to the same position.

During a third step STP31, a thrust variation rate is generated to control the additional thrust P as a function of the position of the manipulation means 3 relative to a reference.

The variation rate is generated as a function of a "measured" position of the manipulation means 3 when the first and second measurements correspond simultaneously to said measured position, said variation rate being adjusted to zero when the first measurement and the second measurement do not correspond to the same position.

Where appropriate, if the first variation rate is equal to the second variation rate, then the variation rate generated for controlling the additional thrust P is equal to the value of the first and second variation rates.

In contrast, when the first variation rate is not equal to the second variation rate, the variation rate generated for controlling the additional thrust P is equal to zero.

During a thrust modification step STP5, the variation rate prepared during the third step STP31 is transmitted to the propulsion system in order to control the magnitude of the additional thrust. Where appropriate, a step of modifying the pitch of the blades of the propellers is performed by applying said variation rate.

The method may also include a step STP42 of positioning a mean pitch for the blades of the propellers in a predetermined position when an emergency electric manipulation member 40 is manipulated by a pilot.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. An electric control device comprising:
   a support;
   manipulation means, the manipulation means being movable relative to the support by a person;
   a first measurement system that takes a first measurement of a current position of the manipulation means relative to a neutral position;
   a second measurement system that takes a second measurement of the current position of the manipulation means, the first measurement system and the second measurement system being independent and dissimilar; and
   a processor unit that compares the first measurement and the second measurement and generates a control signal as a function of either (i) the current position of the manipulation means when the first measurement and the second measurement correspond to the same position for the manipulation means or (ii) the neutral position when the first measurement and the second measurement do not correspond to the same position for the manipulation means.

2. The electric control device according to claim 1, wherein:
   the first measurement system includes means delivering the first measurement in the form of a first signal of analog type, the second measurement system includes means delivering the second measurement in the form of a second signal of digital type.

3. The electric control device according to claim 1, wherein:
   the first measurement system includes a potentiometer or a Hall effect sensor or an active electrical sensor for sensing rotary movements, the first measurement being expressed in the form of a first signal presenting a voltage that depends on the current position of the manipulation means.

4. The electric control device according to claim 1, wherein:
   the second measurement system includes a code wheel constrained to rotate with the manipulation means and a processor system co-operating with the code wheel in order to determine a current binary value corresponding to the current position, the second measurement being expressed in the form of a second signal comprising the binary value.

5. The electric control device according to claim 1, further comprising:
   a return system tending to return the manipulation means to the neutral position.

6. The electric control device according to claim 5, wherein:
   the return system includes a first spring and a second spring that are provided respectively with a first movable end and with a second movable end, the manipulation means having an element that is arranged circumferentially between the first movable end and the second movable end, the return system including an abutment, the first spring tending to move the first movable end circumferentially against the abutment in a first direction in order to position the manipulation member in the neutral position, the second spring tending to move the second movable end circumferentially against the abutment in a second direction in order to position the manipulation member in the neutral position.

7. The electric control device according to claim 1, further comprising:
   a retention system tending to retain the manipulation means in at least one indexed position relative to the support.

8. The electric control device according to claim 1, further comprising:
   a first assembly provided with the support, the manipulation means, and the first and second measurement systems, the processor unit being attached to the first assembly and being secured to the support, the processor unit being connected to at least one computer that is physically independent from the first assembly for transmitting the control signal to the computer, the control signal relating to a parameter of value that is established either as a function of the current position of the manipulation means when the first measurement and the second measurement both correspond to the current position of the manipulation or as a function of the neutral position when the first measurement and the second measurement do not correspond to the same position for the manipulation means.

9. The electric control device according to claim 1, further comprising:
   a first assembly provided with the support, the manipulation means, and the first and second measurement systems, the processor unit not being attached to the first assembly, the processor unit being remote from the first assembly, the processor unit being connected to the first assembly by at least one bus, the bus being connected to the first measurement system and to the second measurement system, the control signal relating to a parameter of value that is established as a function of the current position of the manipulation means when the first measurement and the second measurement both correspond to the current position of the manipulation means or as a function of the neutral position when the first measurement and the second measurement do not correspond to the same position for the manipulation means.

10. An aircraft comprising:
    at least one main rotor contributing at least in part to providing the aircraft with lift;
    at least one propulsion system distinct from the main rotor, the propulsion system generating an additional thrust to contribute at least in part to causing the aircraft to advance;
    an electric control device having a support, manipulation means movable relative to the support by a person, a first measurement system that takes a first measurement of a current position of the manipulation means relative to a neutral position, a second measurement system that takes a second measurement of the current position of the manipulation means, the first measurement system and the second measurement system being independent and dissimilar, and a processor unit that compares the first measurement and the second measurement and generates a control signal as a function of either (i) the current position of the manipulation means when the first measurement and the second measurement correspond to the same position for the manipulation means or (ii) the neutral position when the first measurement and the second measurement do not correspond to the same position for the manipulation means; and wherein the processor unit is connected to the at least one propulsion system to control the additional thrust, at least in part, the control signal requesting a variation rate for the additional thrust transmitted to the at least one propulsion system.

11. The aircraft according to claim 10, wherein:

the at least one propulsion system includes at least one propeller having a plurality of variable pitch blades, and the at least one propulsion system includes a pitch modification system for modifying a pitch of the plurality of variable pitch blades, the processor unit being connected to the pitch modification system to provide the control signal to the pitch modification system.

12. The aircraft according to claim 10, further comprising:

an emergency electric manipulation member connected to the at least one propulsion system.

13. The aircraft according to claim 10, further comprising:

an emergency mechanical manipulation member connected to the at least one propulsion system.

14. A method of controlling a propulsion system of an aircraft, the aircraft further having a manipulation means that is movable relative to a support by a person, the method comprising:

generating a first measurement of a current position of the manipulation means by a first measurement system;

generating a second measurement of the current position of the manipulation means by a second measurement system, wherein the first measurement system and the second measurement system are independent and dissimilar;

comparing the first and second measurements; and generating a variation rate for controlling the propulsion system to generate an additional thrust as a function of the position of the manipulation means relative to a reference, the variation rate being generated as a function of a measured position of the manipulation means when the first and second measurements correspond simultaneously to the measured position, the variation rate being set at zero when the first measurement and the second measurement do not correspond to the same position.

15. The method according to claim 14, wherein the step of comparing the first and second measurements comprises the following stages:

determining a first variation rate corresponding to the first measurement by using a relationship giving the first variation rate as a function of the first measurement;

determining a second variation rate corresponding to the second measurement by using a relationship giving the second variation rate as a function of the second measurement and comparing the first and second variation rates.

16. The method according to claim 14, wherein the propulsion system includes at least one propeller having blades, the method further comprising:

a step of positioning a mean pitch for the blades of the at least one propeller in a predetermined position when an emergency electric manipulation member is manipulated by a pilot of the aircraft.

17. The method according to claim 14, wherein the propulsion system includes at least one propeller having a plurality of variable pitch blades, the propulsion system further includes a pitch modification system for modifying the pitch, the variation rate being a variation rate for the pitch of the blades of the propeller, and the method further comprising:

a step of modifying the pitch by applying the variation rate.

* * * * *